United States Patent
Michaelis et al.

(10) Patent No.: US 7,673,125 B2
(45) Date of Patent: Mar. 2, 2010

(54) RESETTING MULTIPLE CELLS WITHIN A PARTITION OF A MULTIPLE PARTITION COMPUTER SYSTEM

(75) Inventors: Scott L. Michaelis, Plano, TX (US); Greg Albrecht, Plano, TX (US); Richard Powers, Highland Village, TX (US); Anurupa Rajkumari, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1631 days.

(21) Appl. No.: 10/606,462

(22) Filed: Jun. 26, 2003

(65) Prior Publication Data

US 2004/0268105 A1    Dec. 30, 2004

(51) Int. Cl.
    *G06F 9/22* (2006.01)
(52) U.S. Cl. .................... 713/1; 713/2; 712/32
(58) Field of Classification Search ............ 713/1, 713/2, 100; 712/32
    See application file for complete search history.

(56) References Cited

U.S. PATENT DOCUMENTS

| | | | | |
|---|---|---|---|---|
| 5,564,040 A | * | 10/1996 | Kubala | 711/173 |
| 5,717,942 A | * | 2/1998 | Haupt et al. | 712/13 |
| 6,658,591 B1 | * | 12/2003 | Arndt | 714/6 |
| 6,742,139 B1 | * | 5/2004 | Forsman et al. | 714/23 |
| 6,820,207 B2 | * | 11/2004 | Dawkins et al. | 713/324 |
| 7,103,639 B2 | * | 9/2006 | Walton et al. | 709/215 |
| 2002/0116469 A1 | * | 8/2002 | Okuyama | 709/213 |
| 2003/0229775 A1 | * | 12/2003 | Schelling | 713/1 |
| 2003/0236972 A1 | * | 12/2003 | Harrington et al. | 713/2 |

OTHER PUBLICATIONS

Patterson, David A, et al., "Computer Organization and Design", Morgan Kaufman Publishers, Inc., 1998, pp. 579-583.*

* cited by examiner

*Primary Examiner*—Thuan N Du

(57) ABSTRACT

One embodiment of the invention is a method for resetting a partition of a multiple partition system, wherein the partition comprises a plurality of processors, the method comprising executing, by one processor of the plurality of processors, reset code from firmware, building a list of reset register addresses associated with the plurality of processors, sending an interrupt to the other processors of the plurality of processors, resetting the other processors by writing a reset code to their associated reset registers, and resetting the one processor by writing to its associated reset register.

23 Claims, 4 Drawing Sheets

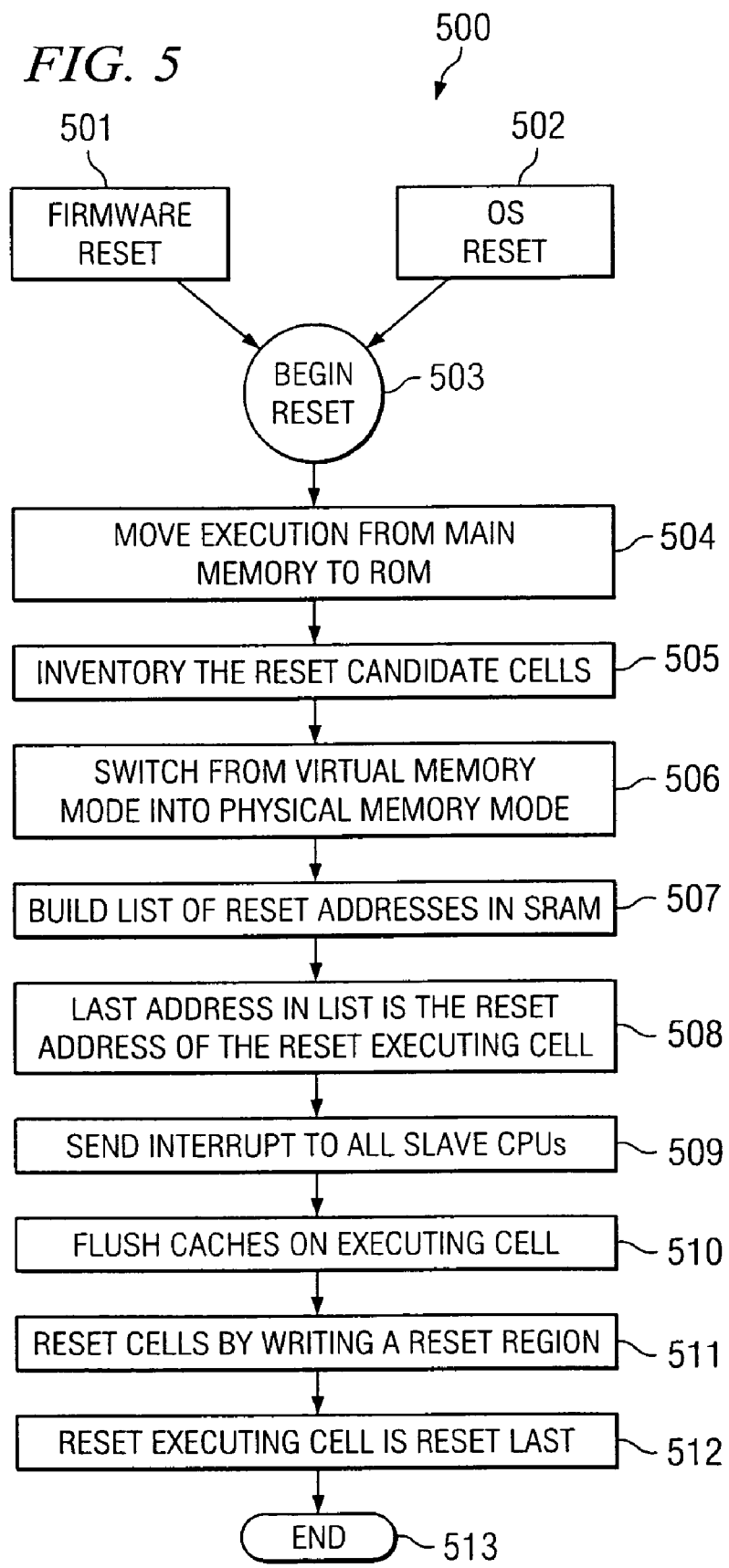

RESETTING MULTIPLE CELLS WITHIN A PARTITION OF A MULTIPLE PARTITION COMPUTER SYSTEM

FIELD OF THE INVENTION

This application relates in general to multiple processor computer systems, and in specific to a system and method for resetting a plurality of cells of partition.

BACKGROUND OF THE INVENTION

In a computer system that includes Itanium Processor Family (IPF) chips, the processors are located in a plurality of cells and may be arranged in a plurality of partitions or protection domains. IPF chips are produced by Intel. Compared with monolithic systems, multi-cell or cellular computer systems are more difficult to reset. On monolithic computer architectures, all resources in the system can be reset simultaneously by asserting one pin or one wire. Cellular systems may be divided into different partitions, each of which need to be reset individually and at different times. Moreover, the cells may be migrated from one partition to another. This makes it is very difficult to reset the cells within a single partition.

FIG. 1 depicts a block diagram of a firmware model 100 for an IPF system. The firmware has three components that separate the operating system (OS) 101 from the processors 102 and the platform 103. The firmware, in general, isolates the OS 101 and other higher level software (not shown) from implementation differences in the processors 102 and the platform 103. The platform 103 includes all of the non-processor hardware. One firmware is the processor abstraction layer (PAL) 104. This layer includes processor implementation specific features and is part of the Itanium processor architecture. PAL 104 operates independently of the number of processors. Another firmware is the platform/system abstraction layer (SAL) 105. SAL 105 includes the platform-specific features. The last firmware is the extensible firmware interface (EFI) 106. This layer is the platform binding specification layer that provides a legacy-free application programming interface (API) to the operating system. PAL 104, SAL 105, and EFI 106 together provide system initialization and boot, machine check abort (MCA) handling, platform management interrupt (PMI) handling, and other processor and system functions which would vary between implementations. Additional information on IPF systems may be found in Intel manuals "Intel Itanium Architecture Software Developer's Manual" and "Itanium Processor Family System Abstraction Layer Specification", both of which are incorporated herein by reference.

A common specification used by the OS is the advanced configuration and power interface (ACPI) 107. This specification defines an industry standard interface that enables the OS to direct motherboard configuration and system power management, which is referred to as operating system directed configuration and power management (OSPM). Additional information on ACPI may be found in the ACPI specification "Advanced Configuration and Power Interface Specification", which is incorporated herein by reference.

FIG. 2 depicts an example of a system 200 showing an arrangement of the processors 102 and platform 103 of FIG. 1. In FIG. 2, the system 200 has five cell boards 201, with each cell board comprising a plurality of processors 202. The system has two partitions or protection domains, namely partition A 203 and partition B 204. Resources within a partition may be used by any of the processors within the partition. Access to resources in other partitions is restricted, and thus this arrangement prevents errors in one partition from migrating to another partition.

Since cells in one partition can be reassigned to another partition, it is difficult to coherently reset all of the cells in a partition. Previous attempts to perform coherent reset of multiple cells typically introduced spurious errors into the partition. One solution is to reset each cell as the cell is located. However, this solution has a disadvantage in that resources disappeared that were still needed or being used by other cells in the partition. Thus, spurious errors are often introduced because there is too much time between the first cell of the partition being reset and the last cell of the partition being reset. Another solution is to reset each cell without attempting to idle the processors. However, this solution also introduces spurious errors into the partition because CPU are attempting transactions that depended on other resources. Another solution is to execute the reset code from main memory. However, this solution has the disadvantage that the main memory can become incoherent as cells reset, and allowing fetches to fail, thus compromising the ability to complete the reset.

BRIEF SUMMARY OF THE INVENTION

One embodiment of the invention is a method for resetting a partition of a multiple partition system, wherein the partition comprises a plurality of processors, the method comprising executing, by one processor of the plurality of processors, resetting code from firmware, building a list of reset register addresses associated with the plurality of processors, sending an interrupt to the other processors of the plurality of processors, resetting the other processors by writing a reset code to their associated reset registers, and resetting the one processor by writing to its associated reset register.

BRIEF DESCRIPTION OF THE DRAWINGS

FIG. 5 depicts an example of a method of resetting a partition according to embodiments of the invention.

DETAILED DESCRIPTION

Embodiments of the invention use firmware to coherently reset multiple cells or nodes within a partition of a multiple-partition computer system, thus resetting all cells within the partition. Embodiments of the invention reset the resources designated as needing to be reset within a short amount of time and in the proper order, thus insuring that no resources disappear before they will no longer be needed. Embodiments of the invention prevent or minimize spurious errors from forming as the resources are reset or disappear. These errors may arise from unrelated system transactions that may occur during the reset.

Embodiments of the invention ensure that all of the resources and/or information that are needed from other cells are collected into a data structure on at least one cell before resetting any of the other cells. Embodiments of the invention place the execution of each of the processors into a known state. Thus, the processors are running in known code and are not relying on resources from other cells, and this reduces or eliminates spurious errors. Embodiments of the invention reset the cells in an order such that dependency conflicts are avoided or at least minimized. In other words, embodiments of the invention reset the individual cells of the partition only after all dependencies on that cell are resolved or at least minimized.

Embodiments of the invention allow the reset of one or more partitions of a multiple partition system. Embodiments of the invention enable a reset that can be requested by any processor in the partition at any time. Embodiments of the invention have the reset code executed from read only memory (e.g. flash ROM), which is always available for execution. This reduces the chance of forming a spurious error and increases the likelihood of a successful reset.

Figure 1:
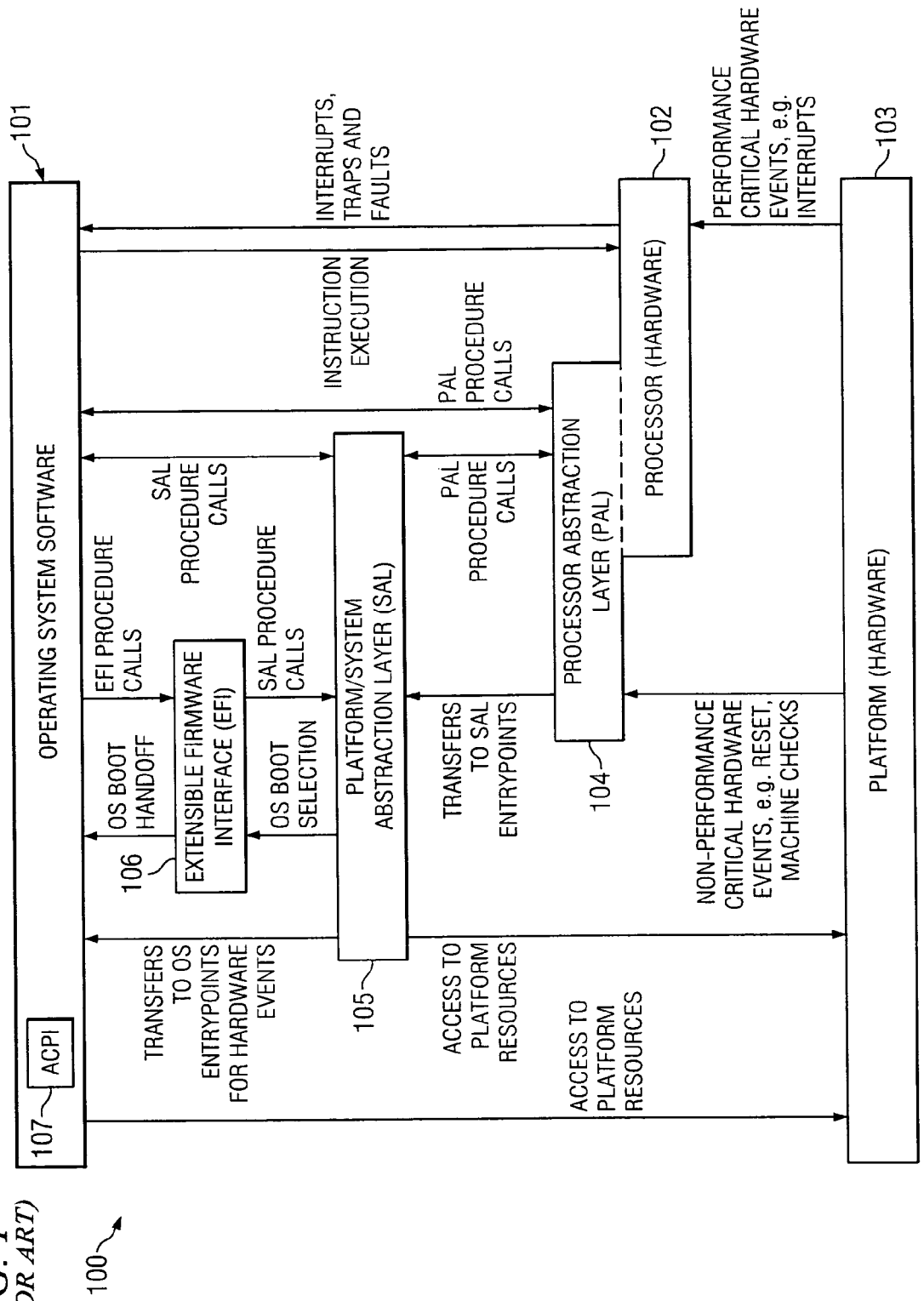
FIG. 1 depicts a block diagram of a firmware model for the IPF processor chip.
Figure 2:
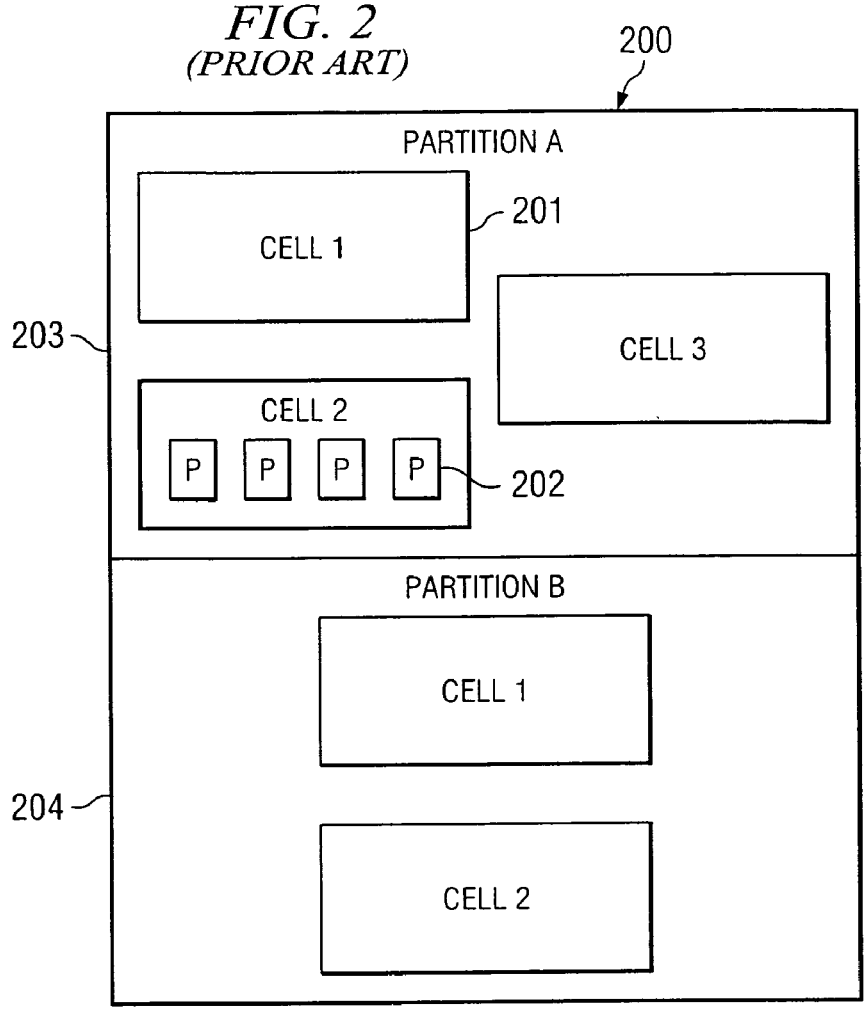
FIG. 2 depicts a plurality of partitions comprising a plurality of cells.
Figure 3:
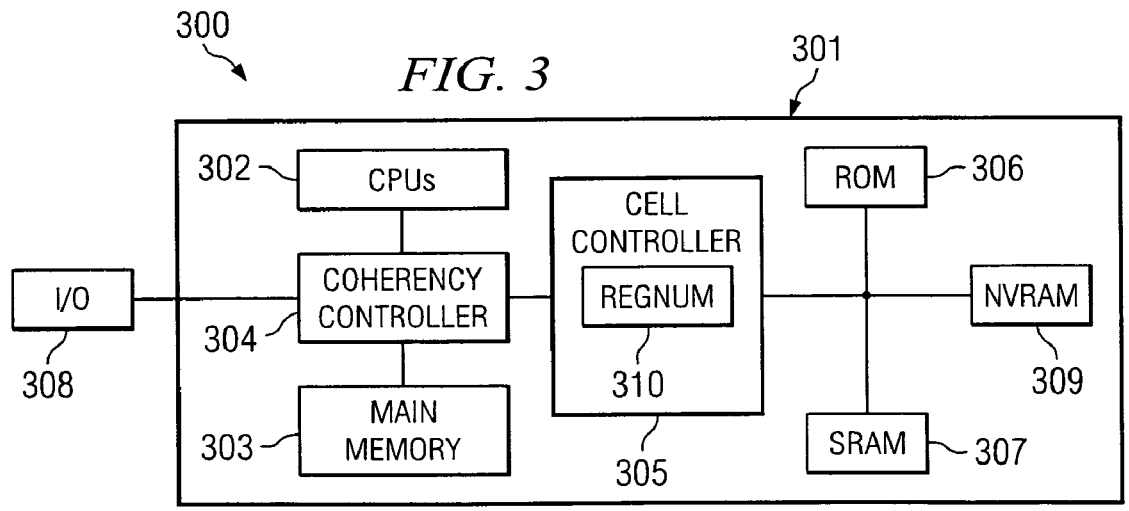
FIG. 3 depicts an example of a layout of a cell according to embodiments of the invention.

FIG. 3 depicts an example of a layout 300 of a cell 301 according to embodiments of the invention. Components of FIG. 3 will be discussed with regard to FIGS. 4 and 5. The cell 301 includes a plurality of processors 302, e.g. four processors, which generally execute code from main memory 303. The coherency of operations of the processors and the memory is managed by coherency controller 304. The main memory may be shared between all (or some) of the processors of the partition. The reset operation of the cell is managed by cell controller 305. This controller has the ability to reset all components on the cell when firmware writes a defined reset value to a CSR or control status register, which is in the cell controller, block 305. The cell also includes read only memory (ROM) 306, which may be flash ROM, and random access memory RAM 307, which may be SRAM. Firmware is typically stored on the ROM 306, and its execution may typically use RAM 307, which may be SRAM. ROM 306 and RAM 307 are typically used by the firmware of the resident cell, and therefore is not used by other cell elements. The main memory, processors and the coherency controller are involved in the reset operation. The cell controller and SRAM are reset as well. Note that the cell controller and SRAM do not have dependencies outside the cell while the reset is occurring. Main memory and processors could have dependencies with resources outside of the local cell. The ROM is not reset and remains static during the reset operation.

Figure 4:
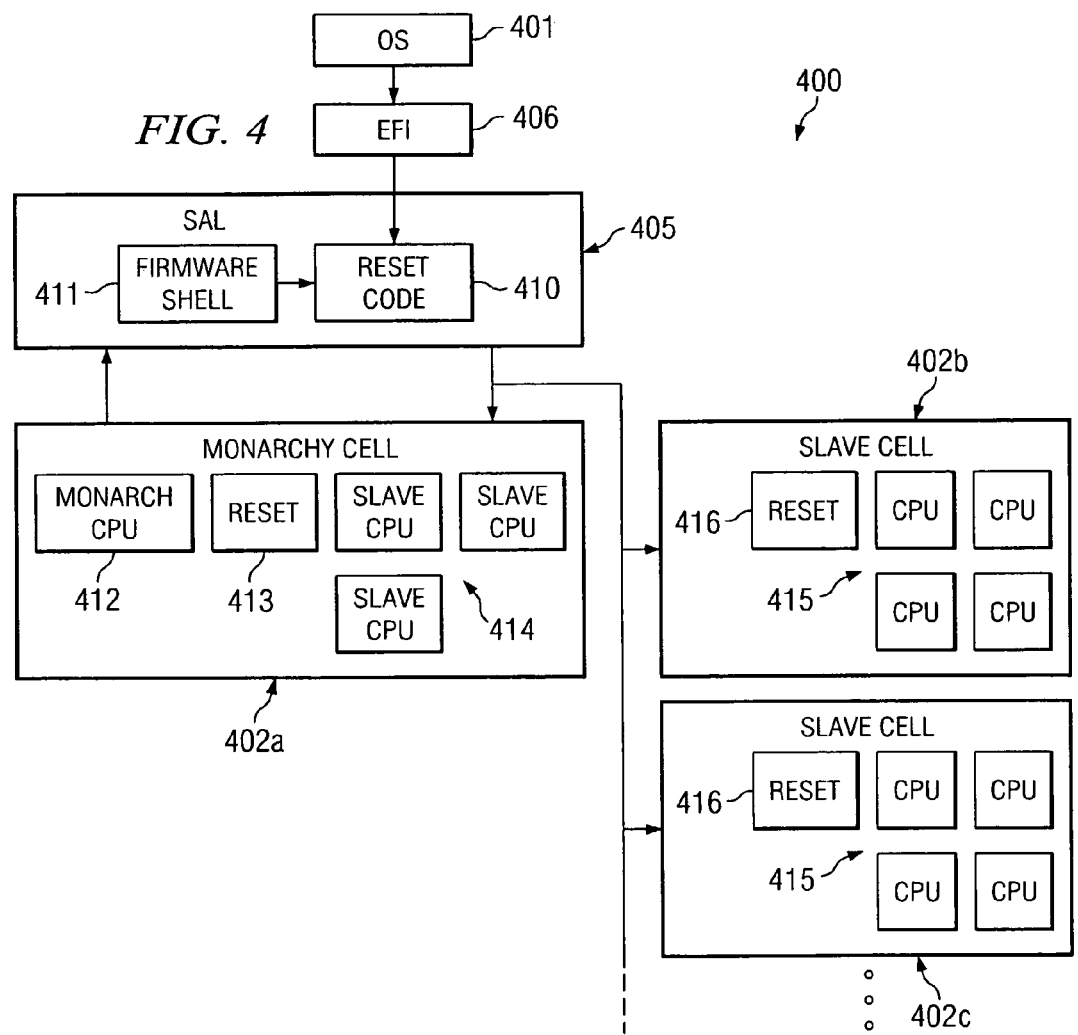
FIG. 4 depicts an example of a block diagram of a firmware model according to embodiments of the invention.

FIG. 4 depicts an example of a block diagram of a firmware model according to embodiments of the invention, and FIG. 5 depicts an example of a method of resetting a partition according to embodiments of the invention. These two figures will be discussed together, and reference components of FIG. 3.

A reset may be initiated by one of several entities. For example, the operating system (OS) 401 of the partition may request a reset of the partition. This may come about from a user request, or monitoring daemons could see an error and request a reset. A system administrator script could request a reset. Such a request may come down from the OS through the EFI firmware layer 406, as shown in block 501. If an OS has been launched and the OS is the requesting entity, the OS should attempt to idle the system before issuing a reset command. The OS should attempt to terminate all data transfers to or from memory or I/O 308, and should idle as many processors as possible before issuing the reset command. Alternatively, any processor in the partition may also request a reset. Such a request may be passed up to the SAL firmware layer 405 as shown in block 502, or it may invoke the reset code 410 directly. A field service engineer may issue the reset at firmware shell 411. They may do this because the system has been repaired or is in need of reconfiguration.

In any event, the reset operation begins, as shown in block 503, by executing the reset code 410 of the SAL layer. The code may be stored in the ROM 306. This moves or branches the execution from the main memory 303 to the ROM memory 306, as shown in block 504. Executing from ROM ensures that no needed resources disappear during execution, which in turn would cause an error known as a machine check abort (MCA). Once the firmware has branched to ROM for the purpose of resetting, it cannot return to executing from main memory, as the call stack will be invalid. If an error occurs during reset processing, the system logs will record what the problem was and then a hard reset must be issued externally.

The requesting processor of processors 302 would execute this code, and if an entity other than a processor requested the reset, then a default processor, e.g. the monarch processor 412, would be assigned this task. As a partition boots, configuration information stored in NVRAM 309 on each cell defines which cells belong to the partition. The cells then exchange information via an interconnect between cells and agree to form a partition. The internal device inventory from each cell is then linked into a partition device inventory on the cell containing the monarch processor 412. The code 410 would determine which cells are in the partition by traversing an internal device inventory structure that was created when the partition was built and the cells were rendezvoused, block 505.

The code would then switch processing from virtual memory mode into physical memory mode as shown in block 506. Processors can operate in two memory modes, physical and virtual. When in virtual mode, any virtual address can be "mapped" to a physical address. This is how operating systems give applications a huge address space. A Translation Lookaside Buffer inside the CPU that translates the virtual reference that the program is referencing to the actual physical address that represents a chunk of memory in the system. The virtual mode of accessing memory needs to be turned off so that firmware can access the resources that it really needs to complete reset processing. Otherwise an address could be mapped to a cell that has already been reset and errors would occur.

The code would then build a list of the reset register addresses as shown in block 507. Each cell includes a reset register 413, 416. Different values written into the register would instruct the cell controller to perform different tasks such as enabling main memory accesses or sending interrupts to the processors. The addresses are collected and stored into an array using RAM 307. The information may be found in an internal device inventory structure that is located in SRAM in each cell, as part of the local device database or tree. The tree is stored in SRAM on each cell. During cell initialization, the main processor or monarch processor for each cell publishes the address of the reset register as a property in the device tree. The last element of the array is the address of the reset register for the cell on which the reset code is being executed. For example, if the monarch cell 402a is the cell that includes the processor that is executing the reset code, then the address of the reset register 413 is the last element of the array, as shown in block 508. Note that the information collection is completed prior to the resetting of any particular resource (when it would be unavailable). Note that the monarch processor is the processor that is designated to execute the reset.

The code would then send an interrupt to all slave processors 414, 415. A slave processor is all of the processors of the partition, except for the processor executing the reset code. Slave processors 414 exist on the monarch cell 402a, which is the cell that includes the processor executing the reset code, i.e. the monarch processor 412. Slave processors 415 also exist on the slave cells 402*b*, 402*c*, which are the remaining cells of the partition, other than the monarch cell. The interrupt would inform each cell that it is about to be reset. The interrupting code writes a predefined value to a control status register (CSR), regnum 310 on the cell controller. When the slave processors receive the interrupt, by convention, they read this register to see what action they should take as a result of being interrupted. They will see the status indicator that a partition reset is about to occur and go to an idle loop, waiting to be reset. One example of an interrupt is CELLST¯RE-SET_ MODE.

To address this, the code traverses the internal device inventory structure looking for all processors. The operating system attempts to idle all processors, but in the event it was unsuccessful because the processor was uninterruptible, the processor that is executing the reset operation will make a second attempt during 509 to idle all processors and get them to a known state. Each processor in the partition publishes its interrupt address in the device tree as a property during cell initialization. The processor executing the reset will traverse the device tree searching for all nodes of type "CPU." When a node is discovered, if it is not to the CPU that is executing the reset, an INIT interrupt signal (the non-maskable, highest level interrupt) will be sent to the CPU as an IPI (inter-processor interrupt). The CPU receiving the INIT will jump to PALE_INIT, which is Intel provided PAL code which saves the processor state and eventually branches to SAL, where it will read CELLST_RESET_MODE from the Cell State CSR and determine that it should execute a spin loop from the ROM. Note that no error record will be generated for this INIT event. The SAL INIT handler runs from ROM by default, so there is no need for the slave processors to execute step 504 explicitly.

The code then flushes the caches on the monarch cell, as shown in block 510. Catches are flushed by calling firmware PAL 104 with the CACHE FLUSH argument. Note that on all other cells, all the CPUs are running from flash in a tight loop as a result of the INIT signal that they received. Cache coherency is not a problem. The flush is only required on the cell that is executing the reset code to ensure that no cache lines are being written as the reset occurs.

The code then begins resetting the cells, as shown in block 511. To perform the reset, the code writes a reset value to each of the reset registers 413, 416 on the cells. The monarch processor that is executing the reset code would loop through the array of reset register addresses, writing the reset value to each address. This causes each cell that was found in the partition to be reset with a soft reset.

After all of the other cells in the partition have been reset, the cell executing the reset code writes the reset value into its own reset register. Thus, it will be the last cell to be reset, as shown in block 512. Note that some small amount of time elapses from the time the reset is written to the last cell and when the monarch processor is actually reset. To accommodate this delay, the executing processor may spin in a loop until it is reset. The method of resetting the cells of the partition is complete, block 513.

As discussed above, not all cells may have been found, because they had not yet rendezvoused. For example, if a new cell board had been installed to replace a faulty cell board just prior to the start of the reset, the new cell board may not have rendezvoused when block 505 of the reset code was executed. Thus, this board would not have been found and would not be reset by the reset code 505 parameter 25.

Errors are possible during execution of the reset code, even following the method of FIG. 5, for example, broken processors may not respond to the INIT interrupt described in paragraph 0024. There could also be a read from an I/O device outstanding when reset processing starts. If the destination of that read is on a cell that has already been reset by the time the transaction completed, an error will be generated. If an error occurs during a partition reset, the firmware will be unable to return to the caller. One mechanism available to the reset code path to deal with errors is to report them as events, e.g. system logs or chassis codes. If the error is severe enough that the reset cannot be processed successfully, then the system will have to be reset externally. If during reset processing, the firmware is unable to determine the partition configuration or the addresses of the reset registers, it will not be able to reset all cells in the partition. This may be logged as a PDH_PROPERTY or PDH_TREE_NODE error in the event record. It is not possible to continue processing without this information. The specific piece of missing information will be logged in the event data field. Furthermore, if for some reason not all of the processors can receive an INIT signal, an error will be logged but processing will continue, and all cells will be reset. It is possible that even after sending INIT signal to each processor in the partition, the processor could still be dependent on some outstanding transaction that will not complete because it is dependent on a resource that has already been reset. However, aspects of the embodiments of the invention minimize the chance of this error occurring. But should it occur, it may result in a MCA occurring. The processor will not get far in handling the MCA as it will be reset soon, but there may be erroneous logs in the ASIC CSRs. Even if a slave processor receives an error, the odds are very good that the monarch processor will reset the cell containing that slave processor some small amount of time after the slave has started processing that error. As the slave processes the error, logs are created in the application specific integrated circuits (ASIC) CSRs. The invention tries to prevent this as much as possible, but it is noted that it could still occur.

What is claimed is:

1. A method for resetting a partition of a multiple partition system, wherein the partition comprises a plurality of processors, the method comprising:
   executing, by one processor of the plurality of processors, a reset code from firmware;
   building a list of reset register addresses associated with the plurality of processors;
   sending an interrupt to the other processors of the plurality of processors;
   resetting the other processors by writing a reset code to their associated reset registers; and
   resetting the one processor by writing to its associated reset register.

2. The method of claim 1, further comprising:
   storing the firmware on a read only memory.

3. The method of claim 1, further comprising:
   storing the list of reset register addresses in random access memory.

4. The method of claim 1, wherein the last reset register address on the list is a reset register address for the cell that is executing the reset code.

5. The method of claim 1, further comprising:
   requesting the execution of the reset code by a processor of the plurality of processors.

6. The method of claim 1, further comprising:
   requesting the execution of the reset code by an operating system of the multiple partition system.

7. The method of claim 1, further comprising:
   requesting the execution of the reset code by a firmware shell of the multiple partition system.

8. The method of claim 1, wherein building the list comprises:
writing the address of the one processor last in the list.

9. The method of claim 1, further comprising:
flushing a cache associated with the one processor, after sending the interrupt.

10. The method of claim 1, further comprising:
moving execution from main memory to read only memory.

11. The method of claim 1, further comprising:
switching from virtual memory mode into physical memory mode.

12. The method of claim 1, wherein the partition comprises a plurality of cells, and each cell comprises at least one processor, the method further comprises:
inventorying the plurality of cells for resetting.

13. The method of claim 1, wherein resetting the one processor occurs after resetting the other processors.

14. The method of claim 1, wherein the plurality of processors are IA-64 processors, and the firmware is system abstraction layer firmware.

15. A partition of multiple partition computer system comprising:
a plurality of processors;
firmware comprising a reset code that resets a portion of the partition, wherein one processor of the plurality of processors executes the reset code; and
random access memory that is not affected by the reset code, that stores a list of addresses associated with the portion.

16. The partition of claim 15, further comprising:
read only memory that stores the firmware.

17. The partition of claim 15, further comprising:
a plurality of cells;
wherein each cell comprises at least one processor of the plurality of processors, and each cell comprises a reset register having an address that is on the list.

18. The partition of claim 17, wherein each cell is reset by writing a reset code to its associated reset register.

19. The partition of claim 17, wherein the address on the list is a reset register address for the cell that comprises the one processor.

20. The partition of claim 17, wherein each cell further comprises resources other than the at least one processor, and a portion of the resources is reset when the cell is reset.

21. The partition of claim 15, wherein the one processor is reset after the other processors of the plurality of processors arc reset.

22. The partition of claim 15, wherein the plurality of processors are IA-64 processors, and the firmware is system abstraction layer firmware.

23. A computer readable medium having computer program logic recorded thereon for operating a partition of a multiple partition computer system, wherein the partition comprises a plurality of processors, the computer program logic comprising:
means for building a list of reset register addresses associated with the plurality of processors;
means for placing each processor of the plurality of processors into a known state; and
means for resetting the plurality of processors by writing a reset code into their associated reset registers.

* * * * *

UNITED STATES PATENT AND TRADEMARK OFFICE
CERTIFICATE OF CORRECTION

PATENT NO. : 7,673,125 B2
APPLICATION NO. : 10/606462
DATED : March 2, 2010
INVENTOR(S) : Scott L. Michaelis et al.

It is certified that error appears in the above-identified patent and that said Letters Patent is hereby corrected as shown below:

In column 8, line 16, in Claim 21, delete "arc" and insert -- are --, therefor.

Signed and Sealed this

First Day of June, 2010

David J. Kappos
*Director of the United States Patent and Trademark Office*